US005774067A

United States Patent [19]

Olnowich et al.

[11] Patent Number: 5,774,067

[45] Date of Patent: Jun. 30, 1998

[54] FLASH-FLOODING MULTI-STAGE INTERCONNECTION NETWORK WITH PARALLEL PATH SEEKING SWITCHING ELEMENTS

[75] Inventors: Howard Thomas Olnowich, Endwell, N.Y.; Jehoshua Bruck, La Canada, Calif.; Michael Hans Fisher, Rochester, Minn.; Joel Mark Gould, Winchester, Mass.; John David Jabusch, Cary, N.C.; Arthur Robert Williams, Croton-On-Hudson, N.Y.

[73] Assignee: International Business Machines Corporation, Armonk, N.Y.

[21] Appl. No.: 950,104

[22] Filed: Oct. 16, 1997

Related U.S. Application Data

[63] Continuation of Ser. No. 481,854, Jun. 7, 1995, abandoned.

[51] Int. Cl.[6] ...................................................... H04Q 1/00

[52] U.S. Cl. ....................... 340/827; 340/825.8; 370/388; 370/397; 370/399; 370/359; 395/311; 379/221; 379/272; 379/292

[58] Field of Search ......................... 340/825.79, 825.03, 340/825.8, 826, 825.89, 827; 370/388, 398, 397, 399, 381, 379, 359; 326/41, 38; 395/312, 311, 182.02; 379/219, 220, 221, 224, 268, 271, 272, 273, 291, 292, 306

[56] References Cited

U.S. PATENT DOCUMENTS

| | | | |
|---|---|---|---|
| 4,661,947 | 4/1987 | Lea et al. | 370/388 X |
| 4,679,190 | 7/1987 | Dias et al. | 370/388 X |
| 4,821,034 | 4/1989 | Anderson et al. | 340/825.8 |
| 4,953,162 | 8/1990 | Lyons et al. | 370/94.1 |
| 4,965,788 | 10/1990 | Newman | 370/60 |
| 5,040,173 | 8/1991 | Richards | 370/54 |
| 5,056,085 | 10/1991 | Vu | 370/60 |
| 5,117,422 | 5/1992 | Hauptschein et al. | 370/95.1 |
| 5,119,366 | 6/1992 | Ardon et al. | 370/54 |
| 5,144,297 | 9/1992 | Ohara | 340/825.89 X |
| 5,155,433 | 10/1992 | Baran et al. | 370/94.3 |
| 5,181,017 | 1/1993 | Frey, Jr. et al. | 340/825.02 |
| 5,345,229 | 9/1994 | Olnowich et al. | 340/825.8 |
| 5,367,518 | 11/1994 | Newman | 340/826 X |
| 5,444,705 | 8/1995 | Olnowich et al. | 370/388 |
| 5,469,154 | 11/1995 | Karp | 340/825.8 |
| 5,542,048 | 7/1996 | Olnowich et al. | 340/825.8 X |
| 6,696,000 | 9/1987 | Payne et al. | 370/388 X |

OTHER PUBLICATIONS

IBM® Technical Disclosure Bulletin: *Asynchronous Digital Video Switching System,* Oct. 1990, vol. 33 No. 5, pp. 227–233.

IBM® Technical Disclosure Bulletin: *XNL Switch And Its Control,* Jan. 1992, vol. 34 No. 8, pp. 16–21.

*Primary Examiner*—Brian Zimmerman
*Assistant Examiner*—William H. Wilson, Jr.
*Attorney, Agent, or Firm*—Jenkens & Gilchrist

[57] ABSTRACT

A multi-stage interconnection network includes the use of switches in the first stage that have parallel path seeking capabilities. With these switches, a directed flash-flood can be instigated from any one node wherein multiple paths through the network to a designated destination node are tried in parallel in an attempt to find a connection path therebetween. The switches in the first and second stages are interconnected such that each switch in the first stage is connected with every possible priority level to the switches of the second stage. The parallel path seeking switches and network are further configured to test for rejection of the flash-flood by monitoring all connections in combination.

19 Claims, 14 Drawing Sheets

8x8 SWITCH
CONNECTION
CAMP-ON
BREAK
PATH SEEKING
INPUT
OUTPUT
12(1)
12(2)
12(3)
12(4)
12(5)
12(6)
12(7)
12(8)
14(1)
14(2)
14(3)
14(4)
14(5)
14(6)
14(7)
14(8)
10
11
16
18
20
21
22
ADAPTER FUNCTION
24(1)
HI-PRI
VALID
DATA1
DATA2
DATA3
DATA4
DATA5
DATA6
DATA7
DATA8
REJECT
ACCEPT

1 BUSY NOT
DATA 0
VALID
D
C
RESET
DFF
28(1)
1 BUSY NOT
AND
30(1)
1 ENABLED
8:1 MUX (NOT)
34(1)
INI-PRI1
INI-PRI1 NOT
AND
36
INI-PRI2
2 BUSY NOT
DATA 1
VALID
28(2)
30(2)
2 ENABLED
34(2)
PRE-PRI2
PRE-PRI2 NOT
INI-PRI3
3 BUSY NOT
DATA 2
28(3)
30(3)
3 ENABLED
34(3)
PRE-PRI3
PRE-PRI3 NOT
INI-PRI4
4 BUSY NOT
DATA 3
28(4)
30(4)
4 ENABLED
34(4)
PRE-PRI4
PRE-PRI4 NOT
ETC.
INI-PRI5

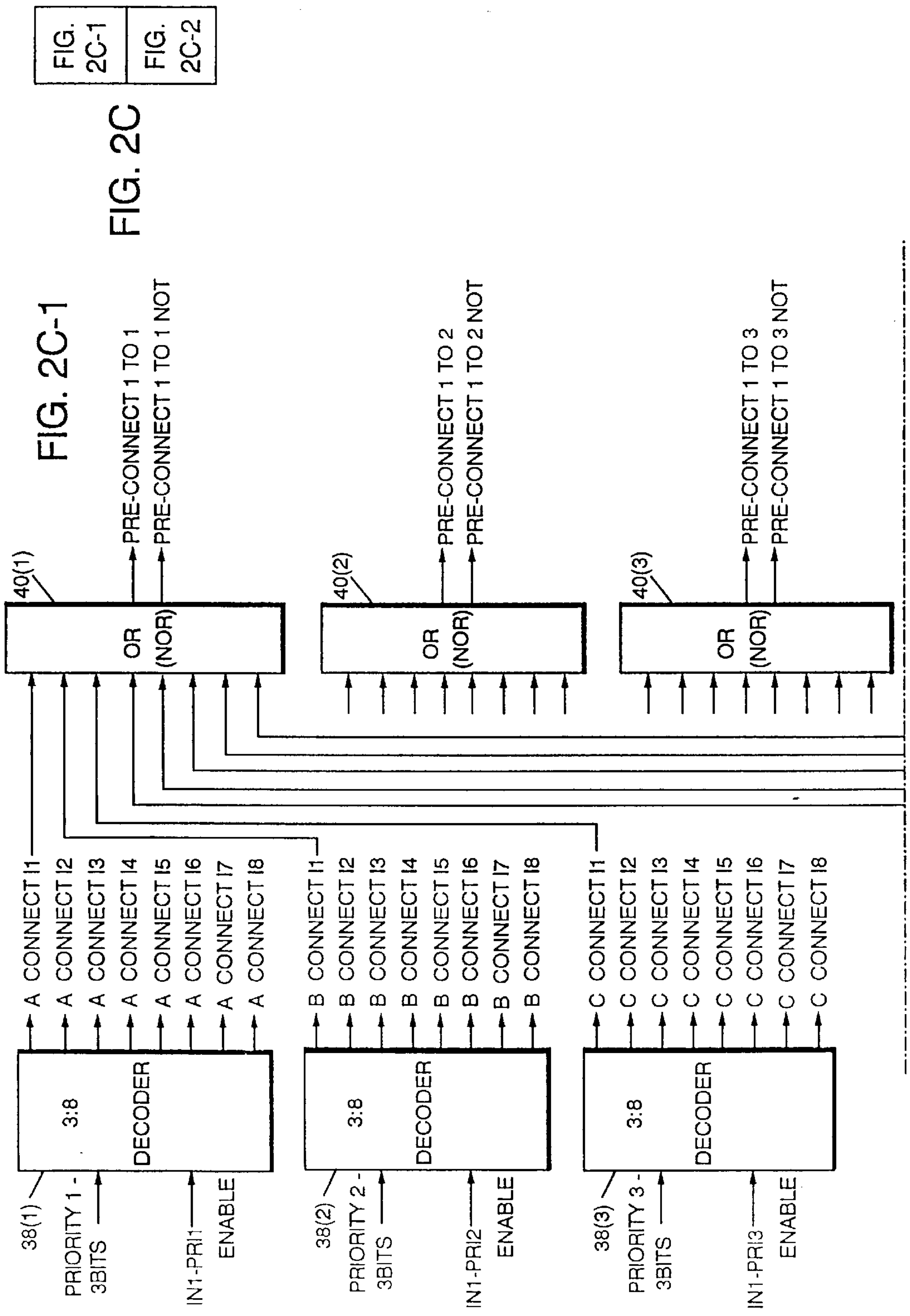
FIG. 2C-1
FIG. 2C-2
FIG. 2C
FIG. 2C-1
38(1)
PRIORITY 1 - 3BITS
IN1-PRI1
ENABLE
3:8 DECODER
A CONNECT I1
A CONNECT I2
A CONNECT I3
A CONNECT I4
A CONNECT I5
A CONNECT I6
A CONNECT I7
A CONNECT I8
38(2)
PRIORITY 2 - 3BITS
IN1-PRI2
ENABLE
3:8 DECODER
B CONNECT I1
B CONNECT I2
B CONNECT I3
B CONNECT I4
B CONNECT I5
B CONNECT I6
B CONNECT I7
B CONNECT I8
38(3)
PRIORITY 3 - 3BITS
IN1-PRI3
ENABLE
3:8 DECODER
C CONNECT I1
C CONNECT I2
C CONNECT I3
C CONNECT I4
C CONNECT I5
C CONNECT I6
C CONNECT I7
C CONNECT I8
40(1)
OR (NOR)
PRE-CONNECT 1 TO 1
PRE-CONNECT 1 TO 1 NOT
40(2)
OR (NOR)
PRE-CONNECT 1 TO 2
PRE-CONNECT 1 TO 2 NOT
40(3)
OR (NOR)
PRE-CONNECT 1 TO 3
PRE-CONNECT 1 TO 3 NOT

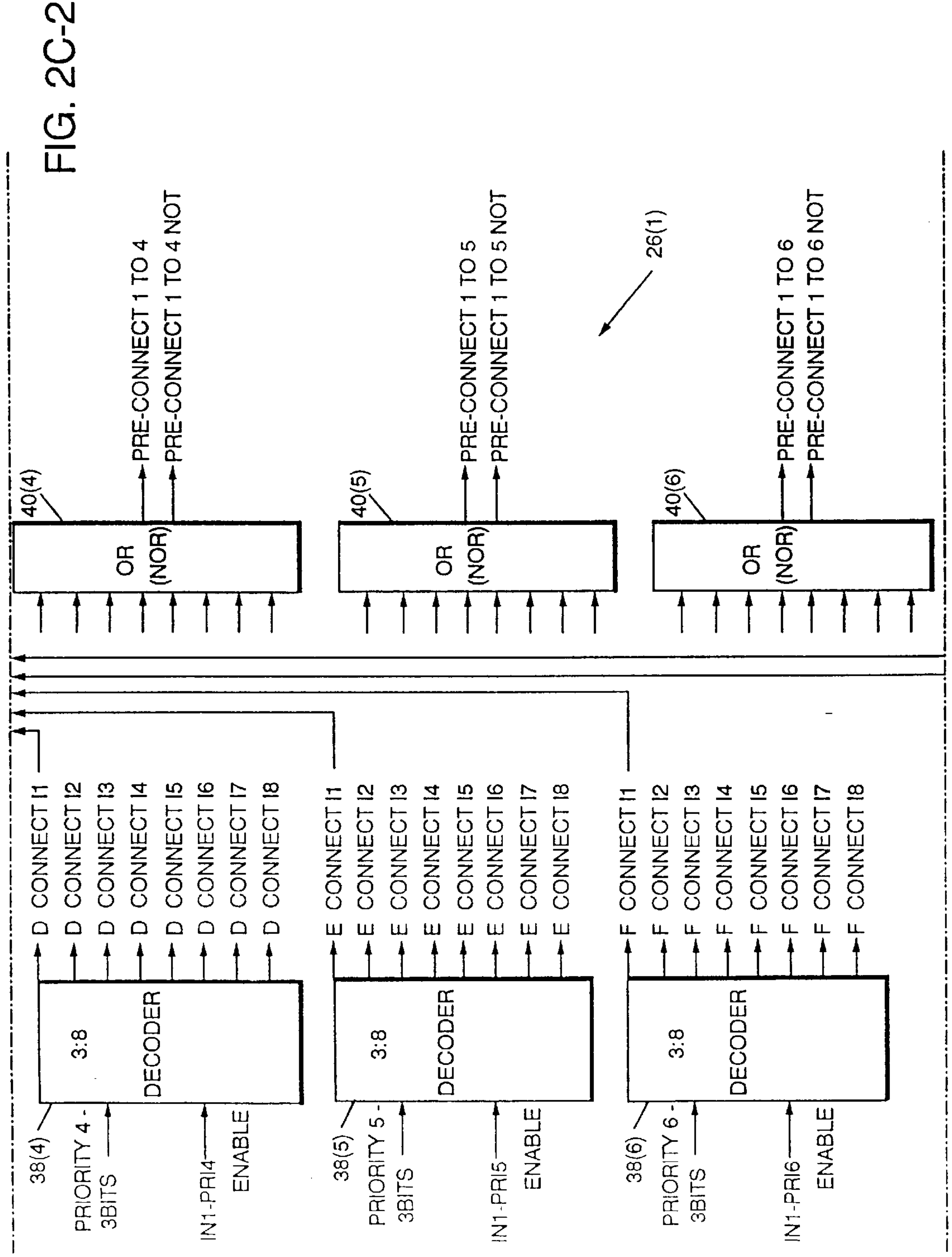
FIG. 2C-2
26(1)
40(4)
OR
(NOR)
PRE-CONNECT 1 TO 4
PRE-CONNECT 1 TO 4 NOT
40(5)
PRE-CONNECT 1 TO 5
PRE-CONNECT 1 TO 5 NOT
40(6)
PRE-CONNECT 1 TO 6
PRE-CONNECT 1 TO 6 NOT
38(4)
PRIORITY 4 - 3BITS
IN1-PRI4 ENABLE
3:8 DECODER
D CONNECT I1
D CONNECT I2
D CONNECT I3
D CONNECT I4
D CONNECT I5
D CONNECT I6
D CONNECT I7
D CONNECT I8
38(5)
PRIORITY 5 - 3BITS
IN1-PRI5 ENABLE
E CONNECT I1
E CONNECT I2
E CONNECT I3
E CONNECT I4
E CONNECT I5
E CONNECT I6
E CONNECT I7
E CONNECT I8
38(6)
PRIORITY 6 - 3BITS
IN1-PRI6 ENABLE
F CONNECT I1
F CONNECT I2
F CONNECT I3
F CONNECT I4
F CONNECT I5
F CONNECT I6
F CONNECT I7
F CONNECT I8

100
NODE 1 CONTROL ADAPTER
24(1)
IN
OUT
22
8x8 FLASH FLOODING SWITCH
10(1)
10(2)
8x8 DUAL PRIORITY SWITCH
104(1)
106(1)
106(2)
NODE 1
NODE 2
NODE 3
NODE 4
NODE 5
NODE 6
NODE 7
NODE 8
NODE 9
NODE 10
NODE 11
NODE 12
NODE 13
NODE 14
NODE 15
NODE 16

8x8 DUAL PRIORITY SWITCH
8x8 FLASH FLOODING SWITCH
NODE 17
NODE 18
NODE 19
NODE 20
NODE 21
NODE 22
NODE 23
NODE 24
NODE 25
NODE 26
NODE 27
NODE 28
NODE 29
NODE 30
NODE 31
NODE 32
NODE 33
NODE 34
NODE 35
NODE 36
NODE 37
NODE 38
NODE 39
NODE 40
106(5)

NODE 41
NODE 42
NODE 43
NODE 44
NODE 45
NODE 46
NODE 47
NODE 48
NODE 49
NODE 50
NODE 51
NODE 52
NODE 53
NODE 54
NODE 55
NODE 56
NODE 57
NODE 58
NODE 59
NODE 60
NODE 61
NODE 62
NODE 63
NODE 64
8x8
FLASH FLOODING SWITCH
8x8
DUAL PRIORITY SWITCH
STAGE 1
STAGE 2
STAGE 3
10(8)
102(1)
102(2)
102(3)
104(6)
104(8)
106(8)
1
2
3
4
5
6
7
8

NODE 1 CONTROL ADAPTER
IN
OUT
24(1)
22
8x8 FLASH FLOODING SWITCH
8x8 FLASH FLOODING SWITCH
DUAL PRIORITY SWITCH
8x8 DUAL PRIORITY SWITCH
8x8 DUAL PRIORITY SWITCH
8x8 DUAL PRIORITY SWITCH
NODE 1
NODE 2
NODE 3
NODE 4
NODE 5
NODE 6
NODE 7
NODE 8
NODE 9
NODE 10
NODE 11
NODE 12
NODE 13
NODE 14
NODE 15
NODE 16
10(1)
10(2)
104(1)
104(2)
106(2)
108(1)
108(2)

NODE 17
NODE 18
NODE 19
NODE 20
NODE 21
NODE 22
NODE 23
NODE 24
NODE 25
NODE 26
NODE 27
NODE 28
NODE 29
NODE 30
NODE 31
NODE 32
NODE 33
NODE 34
NODE 35
NODE 36
NODE 37
NODE 38
NODE 39
NODE 40
8x8
DUAL PRIORITY SWITCH
DUAL UN PRIORITY SWITCH
FLASH FLOODING SWITCH
104(3)
108(3)
108(4)
104(4)
108(5)
104(5)
106(5)

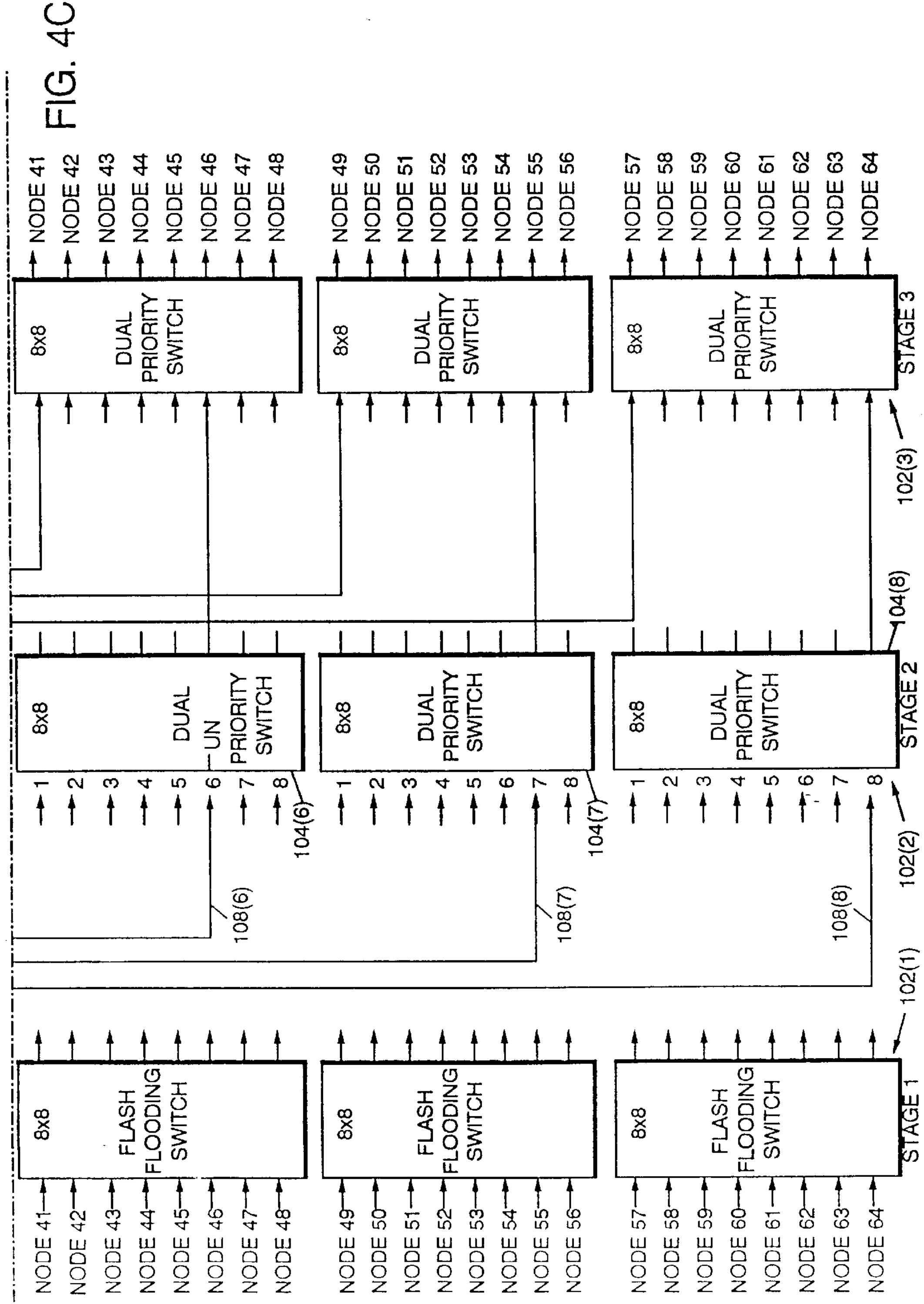
FIG. 4C
NODE 41
NODE 42
NODE 43
NODE 44
NODE 45
NODE 46
NODE 47
NODE 48
NODE 49
NODE 50
NODE 51
NODE 52
NODE 53
NODE 54
NODE 55
NODE 56
NODE 57
NODE 58
NODE 59
NODE 60
NODE 61
NODE 62
NODE 63
NODE 64
8x8
FLASH FLOODING SWITCH
8x8
FLASH FLOODING SWITCH
8x8
FLASH FLOODING SWITCH
STAGE 1
102(1)
108(6)
108(7)
108(8)
102(2)
1
2
3
4
5
6
7
8
104(6)
104(7)
8x8
DUAL UN PRIORITY SWITCH
8x8
DUAL PRIORITY SWITCH
8x8
DUAL PRIORITY SWITCH
STAGE 2
104(8)
102(3)
8x8
DUAL PRIORITY SWITCH
8x8
DUAL PRIORITY SWITCH
8x8
DUAL PRIORITY SWITCH
STAGE 3
NODE 41
NODE 42
NODE 43
NODE 44
NODE 45
NODE 46
NODE 47
NODE 48
NODE 49
NODE 50
NODE 51
NODE 52
NODE 53
NODE 54
NODE 55
NODE 56
NODE 57
NODE 58
NODE 59
NODE 60
NODE 61
NODE 62
NODE 63
NODE 64

FLASH-FLOODING MULTI-STAGE INTERCONNECTION NETWORK WITH PARALLEL PATH SEEKING SWITCHING ELEMENTS

This application is a continuation of application Ser. No. 08/481,854, filed on Jun. 7, 1995, which was abandoned upon the filing hereof.

CROSS-REFERENCE TO RELATED APPLICATIONS

This application for patent is related to the following prior applications for patent:

U.S. Ser. No. 07/677,543, filed Mar. 29, 1991, entitled "All-Node Switch, An Unclocked, Unbuffered Asynchronous Switching Apparatus" by P. A. Franaszck, et al. now abandoned, but continued as U.S. Ser. No. 08/143,977 now abandoned, but continued as U.S. Ser. No. 08/457,789 and now appeal;

U.S. Ser. No. 07/799,497, filed Nov. 27, 1991, entitled "Multi-Function Network" by Howard T. Olnowich, et al. now abandoned, but continued as U.S. Ser. No. 08/216,789 now abandoned, but continued as U.S. Ser. No. 08/606,232 and allowed as U.S. Pat. No. 5,654,695; and This application for patent is also related to the following application for patent filed concurrently herewith: U.S. Ser. No. 08/481,855, filed Jun. 7, 1995, entitled "Multi-Stage Interconnection Network with Selectable Function Switching Apparatus" by Howard T. Olnowich, et al. (IBM # EN9-94-021) allowed, issued pending.

The disclosures of each of the foregoing applications for patent are hereby incorporated by reference herein for all permissible purposes.

BACKGROUND OF THE INVENTION

1. Technical Field of the Invention

The present invention relates to multi-stage interconnection networks and, in particular, to a switch with parallel path seeking functionality for use in providing flash-flooding operations in the multi-stage network.

2. Description of the Prior Art

In the field of parallel processing the need for better performing interconnection networks comprising multiple stages is becoming of prime importance. One commonly used switch in multi-stage interconnection networks comprises the asynchronous, low latency, internode switch (or "ALLNODE Switch") which is the subject of several prior pending applications for patent including U.S. application Ser. No. 07/677,543 now abandoned. This switch is operable in two functional switching modes based on the presence of different types of traffic patterns on the network. The first functional mode causes path connections in the network to be broken if "cold" or random traffic encounters blockage in the network. Path establishment through the network is thereafter blindly and successively retried over a different (alternate) path until a connection is made. The second functional mode causes traffic which has been classified as "hot" traffic to camp-on to the switch and not break the path connection to that switch through the network. In accordance with the camp-on functional mode, requests for path connections are placed into a priority queue at the switch where blockage is being experienced. The queued requests are thereafter serviced in order of receipt when the blockage dissipates to make path connections for the camped-on hot traffic.

There are known disadvantages to the use of the prior art multi-mode All Node Switch as a switch in a multi-stage network. As mentioned above, alternate paths are chosen randomly and blindly by the nodes and their network adapters before entering the network. This approach leads to choosing a fixed path to be tried, with no investigation made prior to selection and try as to whether the chosen path is available. If the fixed path is blocked for random traffic, the network adapter blindly picks an alternate path and tries again to establish a connection. This procedure of random path retrying without advance testing for path availability continues inefficiently (perhaps over several tries without success) until a connection is made.

Accordingly, there is a need for a switch for use in a multi-stage network that utilizes something other than the prior art blind method for finding a connection path through the network. Preferably such an improved switch would search the plural potential paths in parallel while simultaneously identifying the available path or paths for making the connection through the network.

SUMMARY OF THE INVENTION

The present invention addresses the limitations of the prior art ALLNODE Switch (with "cold" traffic break and "hot" traffic camp-on functional modes) by providing an additional intelligent feature facilitating the efficient selection of paths through the network. The additional feature comprises a parallel path seeking capability wherein the switch itself evaluates and determines which of several optional alternate paths should be selected. To support this functionality, information concerning available alternate paths through the multi-stage network is monitored and provided to the switch. The switch then selects from and makes its connection in one embodiment over a single one of those identified available paths, and in another embodiment simultaneously over plural ones of the identified available paths.

An additional aspect of the invention comprises the operation of the adapter function for the switch in exercising control over the path selection process. By monitoring path availability and reporting same to the switch, the adapter function inhibits switch selection of a blocked or failed alternate path. The adapter function further exercises control over the path selection process by restricting switch selection, regardless of availability, to only certain paths. The various alternate paths may thus be collected into various groups of paths, with each group of paths designated to serve a particular function of the switching element. Certain functions may accordingly be directed to specific paths. For example, for the ALLNODE Switch with break and camp-on functional modes, certain ones of the alternate paths are grouped to carry "cold" traffic subject to the break functionality, while other ones of the alternate paths are grouped to carry "hot" traffic subject to the camp-on functionality. As additional functionalities are added to the switch, additional groupings of alternate paths are made to service those functionalities.

The present invention still further comprises an interconnection network utilizing the foregoing switch for the purpose of initiating a flash-flood path selection and connection operation. In accordance with this aspect of the invention, parallel path seeking and simultaneous path access is performed beyond the confines of a single switch, and propagated forward through the entire network. The first or highest priority one of the multiple trying paths that reach the desired destination is completed for purposes of carrying the message traffic. The various stages of switches in the network are interconnected with varying priorities to facilitate the completion of at least one connection from each switch during simultaneous flash-flooding operations by multiple switches.

BRIEF DESCRIPTION OF THE DRAWINGS

A more complete understanding of the present invention may be obtained by referring to the following Detailed Description in conjunction with the accompanying Drawings wherein.

DESCRIPTION OF THE PREFERRED EMBODIMENT

Figure 1:
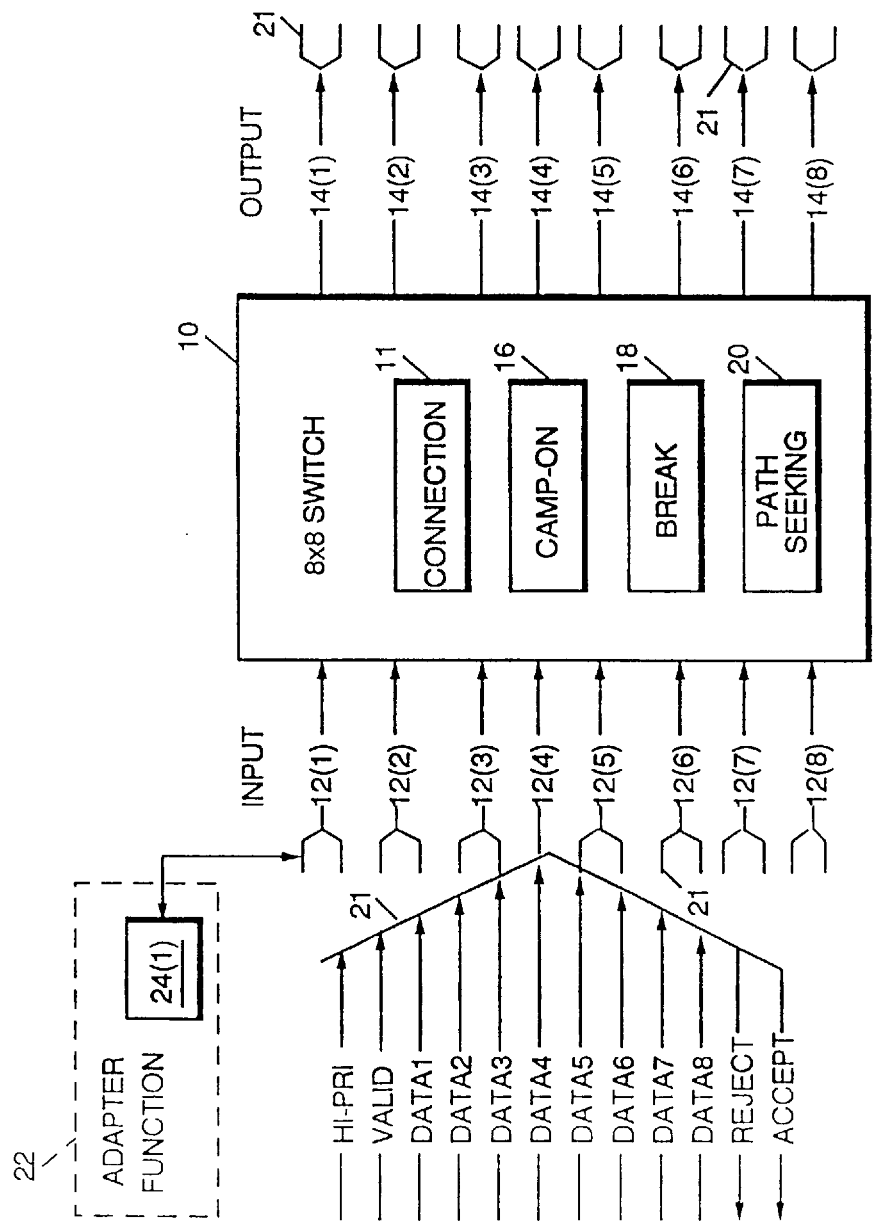
FIG. 1 illustrates an eight-by-eight path seeking switch of the present invention.

Reference is now made to FIG. 1 wherein there is illustrated an eight-by-eight path seeking switch 10 of the present invention including eight input ports 12(1)–12(8) and eight output ports 14(1)–14(8). The switch 10 includes functionability 11 to connect any one input port 12 to any one or more output ports 14. The switch 10 comprises the eight-by-eight ALLNODE Switch as described several pending applications for patent, having the well known camp-on functionality 16 and break functionality 18, and further modified in accordance with the present invention to additionally include a path seeking functionality 20. With this path seeking functionality 20, as will be described in more detail herein, the switch 10 operates to evaluate and determine which of several optional alternate paths through the switch from the input ports 12 to the output ports 14 should be selected. The result of this evaluation comprises the accessing in one embodiment of a single path from the plural evaluated paths, and in a second embodiment the parallel accessing of multiple ones of the plural evaluated paths.

The interface 21 at each of the input and output ports 12 and 14 contains twelve lines comprising: eight data lines (DATA1–DATA8) plus four interface control lines (VALID, ACCEPT, REJECT, and HI-PRI). The VALID interface control line when active (logic high), indicates that a message is in the process of being transmitted. When inactive (logic low), however, the VALID interface control line causes the switch 10 to reset, breaks all connections, and returns the switch to its idle state. The HI-PRI interface control line when active (logic high) invokes the camp-on functionality 16 of the switch 10. When inactive (logic low), however, the HI-PRI interface control line invokes the break functionality 18. The REJECT interface control line has a signal flow in a direction opposite that of the data signals carried on the data lines (DATA1–DATA8). This control line indicates that a REJECT condition has been detected and that a connection along a selected path was not established or the message was not successfully transmitted. The ACCEPT interface control line also has a signal flow direction opposite that of the data signals carried on the data lines (DATA1–DATA8). This control line is used to acknowledge the successful transmission of a message from the switch 10.

The path seeking switch 10 includes an adapter function 22 comprising one controlling adapter 24 for each of the input ports 12(1)–12(8). Only the controlling adapter 24(1) for input port 12(1) is shown in FIG. 1 for reasons of simplifying the drawing. The switch 10 is commanded by the adapter function 22 to connect certain ones of the input ports 12 to certain ones of the output ports 14 in accordance with a path selection method and in response to a received path selection command. This path selection command is transferred prior to the receipt of data so that the paths selected by the command can be established prior to data receipt.

The path selection command transmitted by the adapter function 22 is specific for each input port 12. There is no need, however, to identify a particular input port 12 to which the command is directed. This is because the command is transmitted from the appropriate one of the controlling adapters 24 of the adapter function 22 to the corresponding input port 12 of the switch 10 using the eight data lines (DATA1–DATA8) for that input port. These data lines are then subsequently used, after the establishment of the selected paths, to carry data to the switch.

The path selection command comprises a specification of the eight output ports 14(1)–14(8) (and hence the eight alternate paths) that the switch 10 should choose from in routing the data subsequently received data over lines DATA1–DATA8 at the input port 12 where the command was received. The path selection command is transmitted to the switch 10 during a switch set-up time period and, in accordance with the path selection method, there is a one-to-one corresponding relationship between the enabling or disabling of a data line (DATA1–DATA8) and the enabling or disabling of an output port 14(1)–14(8) for consideration and possible connection. By this it is meant that the transmission over DATA1 enables (with a logic high) or disables (with a logic low) output port 14(1) with respect to a connection to the input port; DATA2 enables or disables output port 12(2) with respect to a connection to the input port; DATA3 enables or disables output port 12(3) with respect to a connection to the input port; and so on. Accordingly, each active (logic high) data line enables the corresponding output port 14 as an allowable path selection for data transmission, while each inactive data line disables the corresponding output port 14 as an allowable path selection.

The foregoing may be better understood through the analysis of a specific example. In this example, a path selection command having a binary data pattern of (01001010) is transmitted during the switch set-up time period from the controlling adapter 24(1) over data lines DATA1–DATA8 of the interface 11 to input port 12(1) This particular path selection command (when sent) commands the path seeking functionality 20 of the switch 10 to establish a connection from input port 12(1) in one embodiment to one and only one, and in a second embodiment to each, of the following output ports 14 based upon port availability: output port 14(2) (corresponding to a logic high on DATA2); output port 14(5) (corresponding to a logic high on DATA5); and, output port 14(7) (corresponding to a logic high on DATA7).

The switch 10 initially connects to all of the enabled output ports 14 depending upon path availability. In the second embodiment of the invention, a connection is made to each of the available ports for the purpose of simultaneous path access useful in a flash-flooding operation as will be described in more detail herein. In the first embodiment, however, in the event that more than one of the paths designated by the path selection command is available, only one of the paths is eventually selected by the path seeking functionality 20 of the switch 10 for the subsequent transfer of data received at the input port 12. This selection for the first embodiment is made either randomly or by means of a priority determination (such as round robin or based on input port) as will be discussed in more detail. All other path connections will be rejected and dropped.

If none of the paths designated by the path selection command are available, the switch 10 rejects the connection back to the controlling adapter 24 by activating the REJECT interface control line. The connection to the input port 12 is thereafter broken or a camp-on is initiated based on the state of the HI-PRI interface control line. If the HI-PRI interface control line is active (logic high), the switch 10 camps-on to all of the paths identified in the path selection command until a successful connection is made on one or more of the paths. Otherwise (logic low), the break functionality 18 is initiated. The unsuccessful paths are then dropped and the camp-on functionality reset. It is over the successful connection(s) that the subsequent transfer of data received at the input port 12 is made.

Figure 2A:
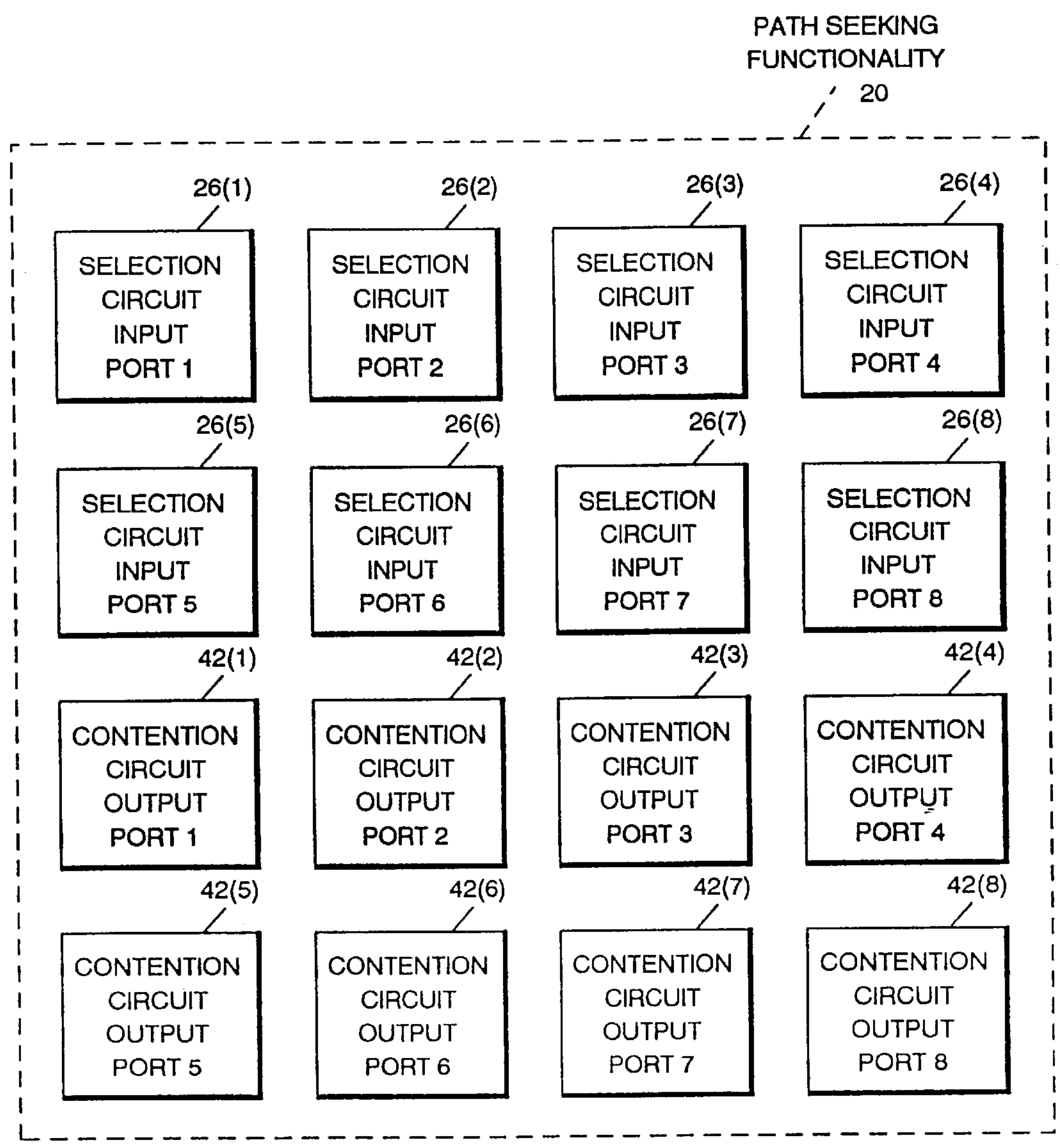
FIGS. 2A–2D are block and logic circuit diagrams for the path seeking functionality of the switch shown in FIG. 1.
Figures 1, 2, 2B:
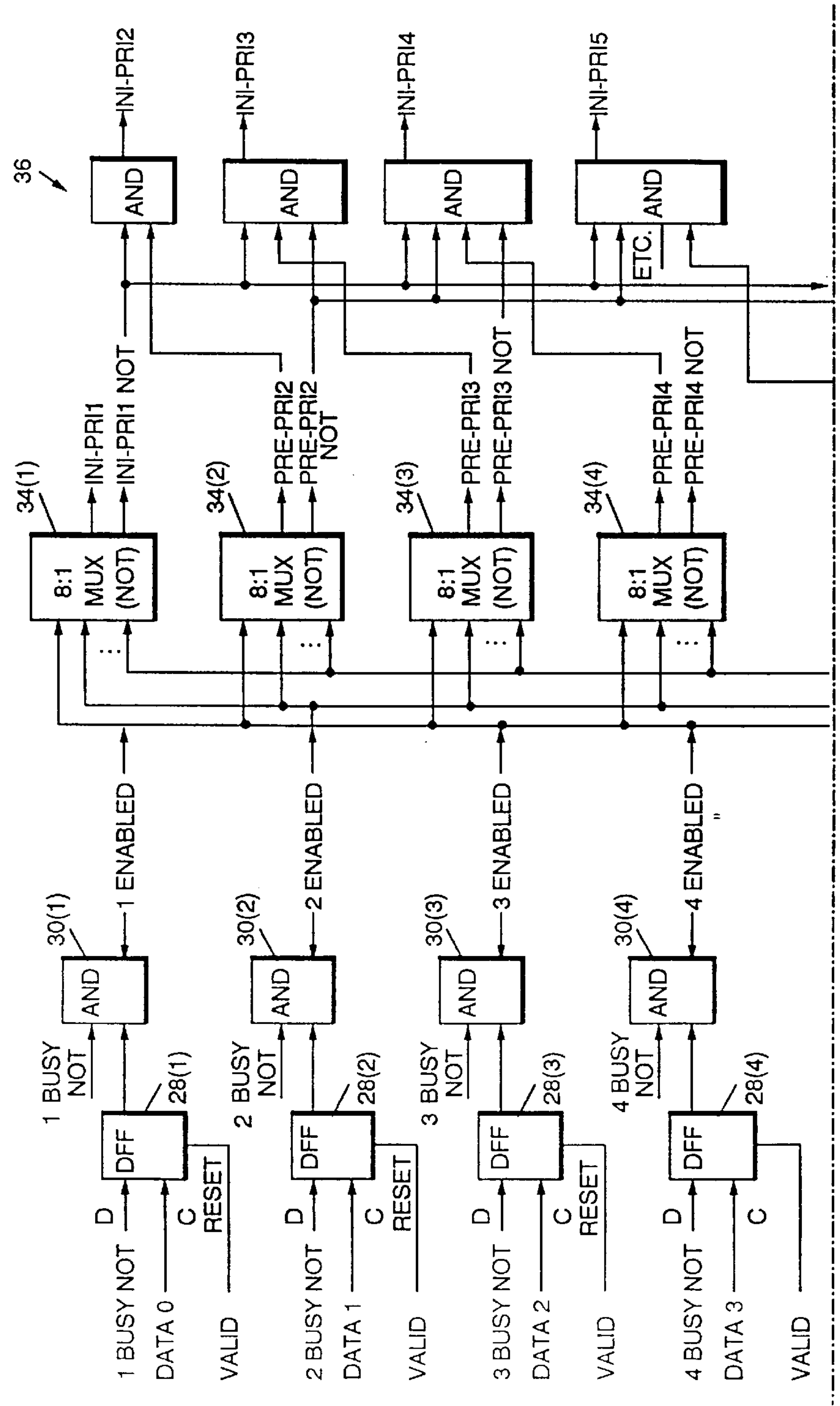
Figures 2, 2B:
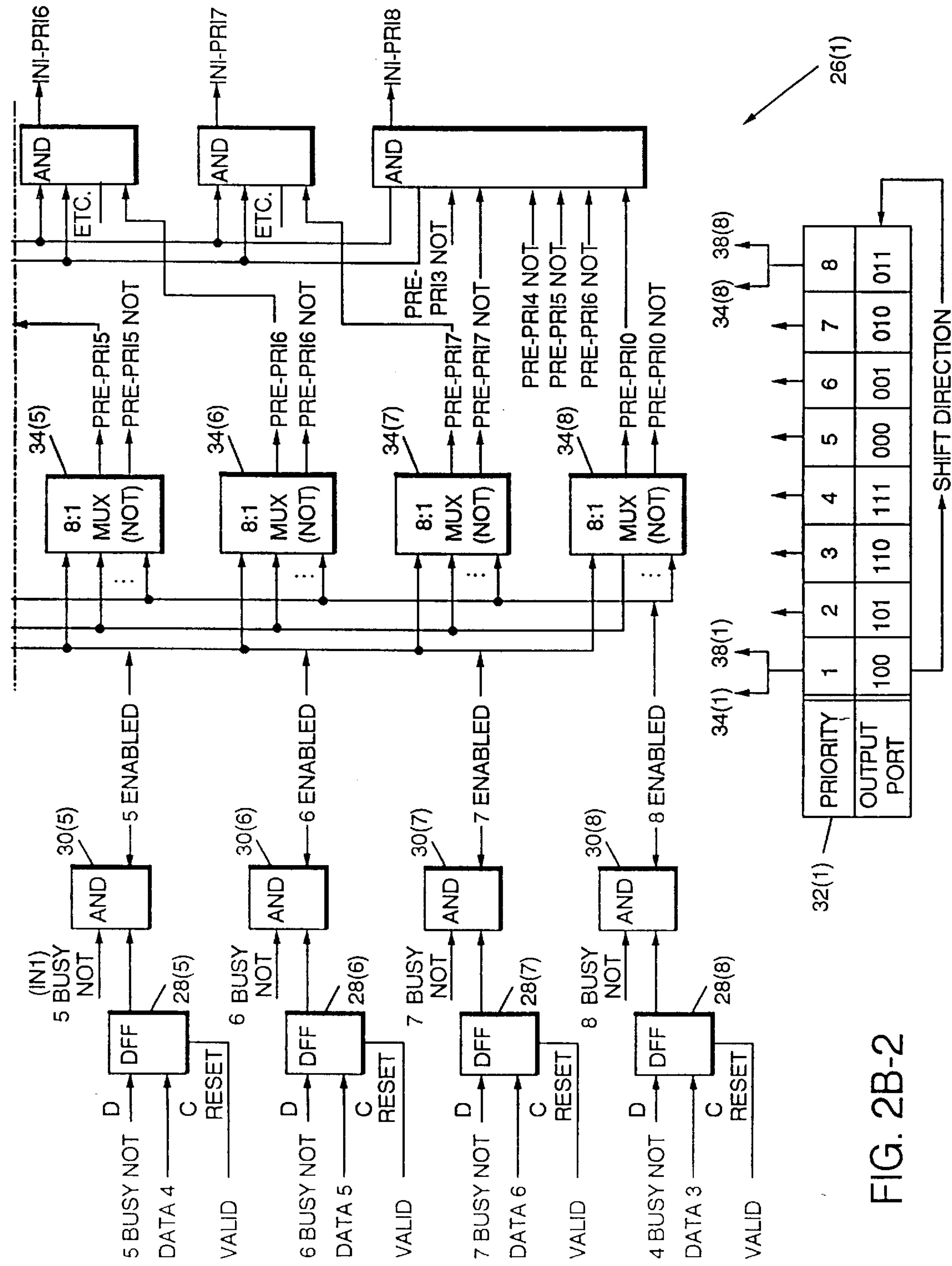
Figures 2, 2C, 3:
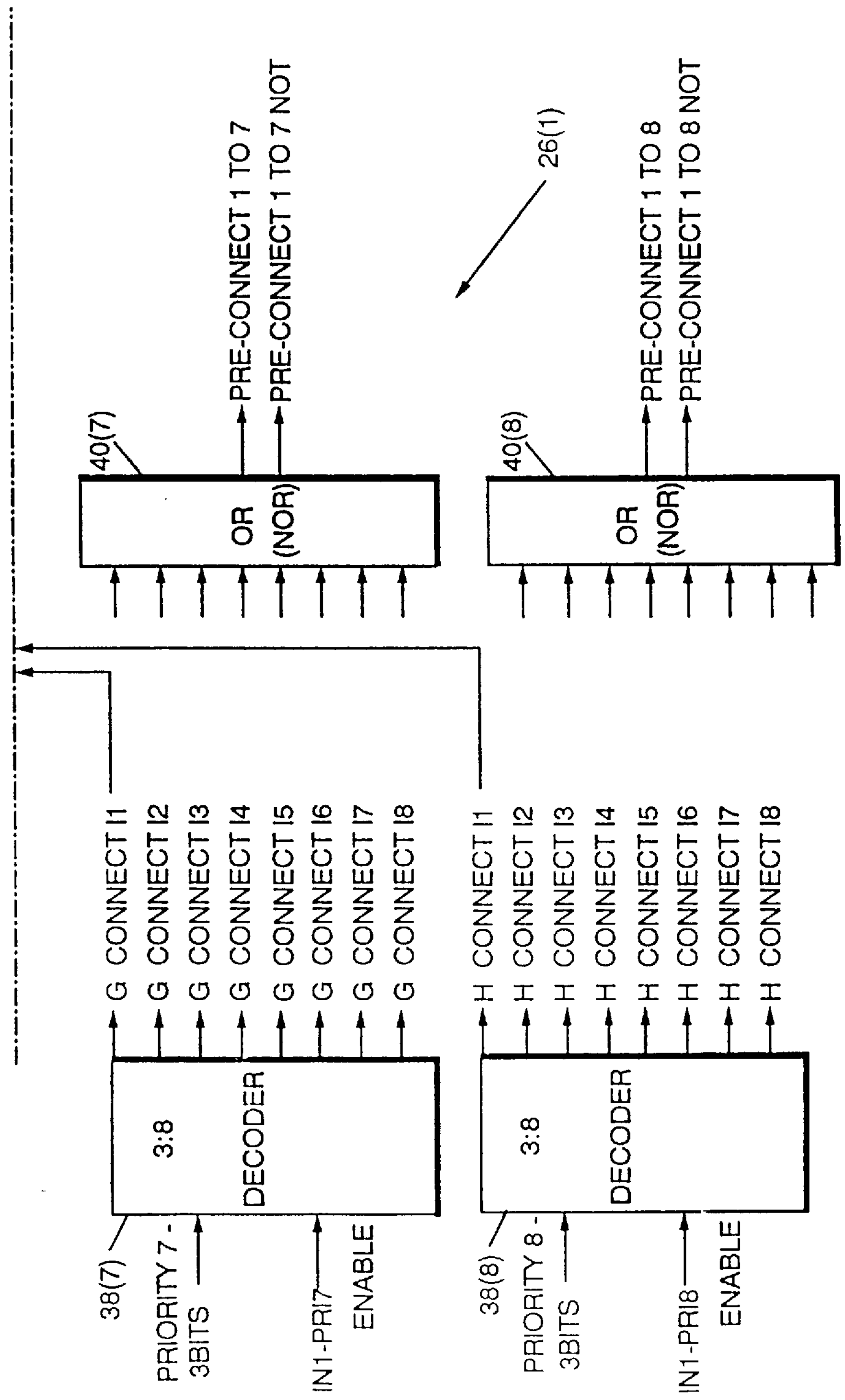
FIG. 3 is a block diagram of a sixty-four by sixty-four Flash-Flood Network in accordance with the present invention and utilizing the switch of FIG. 1.

Reference is now made to FIG. 2A wherein it is shown that the functionality 20 comprises a selection circuit 26 for each input port 12(1)–12(8) of the switch 10. Referring now also to FIGS. 2B and 2C, there is shown the logic of the selection circuit 26 of the path seeking functionality 20 of the switch 10. The particulars of a selection circuit 26 in the functionality 20 are shown with respect to the selection circuit 26(1) for the first input port 12(1). Data lines DATA1–DATA8 of input port 12(1) are each fed to the clock input (c) of a different DFF latch 28(1)–28(8). The rise of any data line DATA1–DATA8 causes the corresponding latch 28(1)–28(8) to activate (logic high) its output provided the xBUSYNOT signal received at its D input is also activated (logic high), wherein "x" comprises 1–8 corresponding to the output ports 14(1)–14 (8). The latches 28 further receive the VALID signal at their reset (R) inputs. The output of each latch 28(1)–28(8) is connected to one input of a corresponding dual input AND gate 30(1)–30(8).

The XBUSYNOT signal received at the D input on each DFF latch 28 is also connected to the other input of the corresponding AND gate 30 which outputs a signal xENABLED, wherein "x" again comprises 1–8 corresponding to the output ports 14(1)–14(8). The xENABLED output indicates whether the x identified output port 14(x) comprises an option to be considered for connection to input port 12. The state of the XBUSYNOT signal is determined by whether the corresponding output port 14(1)–14(8) is previously busy. For instance, DFF latch 28(1) is clocked by DATA1, which if active (logic high) in the path selection command indicates that output port 14(1) is an option to be considered. If output port 14(1) was not previously busy, the 1BUSYNOT signal applied to the D input to latch 28(1) is high. The latch 28(1) is then set with the rise of the DATA1 signal causing the 1ENABLED signal output from AND gate 30(1) to also go high. This indicates that output port 14(1) comprises an option to be considered for connection to input port 12(1) at NODE 1 (because it is not busy). If, however, output port 14(1) was previously busy, the 1BUSYNOT signal applied to the D input of latch 28(1) is low. The latch 28(1) is then not set with the rise of the DATA1 signal causing the 1ENABLED signal output from AND gate 30(1) to remain low. This indicates that output port 14(1) does not comprise an option to be considered for connection to input port 12(1) at NODE 1 (primarily because it is presently busy and not therefore available).

In accordance with the second embodiment of the switch 10, each output port 14(1)–14(8) determined to comprise an option for consideration based on an active (logic high) XENABLED signal is connected simultaneously, and in parallel, to the requesting input port 12. Accordingly, Connect y to x signals are generated for each of the determined options for consideration for which a simultaneous, parallel connection is to be made. In this connection, "y" comprises 1–8 corresponding to the input port(s) 12(1)–12(8) involved in the connection, and "x" comprises 1–8 corresponding to the output ports 14(1)–14(8) involved in the connection.

Controlling adapter 24 commands all the latches 28, or any desired subset thereof, to set by placing a pulse on the corresponding data line DATA1–DATA8. Following receipt of the path selection command, the functionality 20 of the switch 10 operates to attempt to establish a connection to one (first embodiment) or more (second embodiment) of the commanded path options. In the selection circuits 26(1)–26 (8), and in accordance with the first embodiment of the switch 10, this connection is attempted on a priority basis utilizing a corresponding round robin shift register 32 (only 32(1) shown for circuit 26 (1)). Other prioritization method may be used if desired. The registers 32 each define eight different priority levels for its associated input port 12 comprising one priority level for each alternate output port 14 path. Priority levels descend from one to eight with one being the highest priority and eight being the lowest priority. At the present moment for register 32(1) , the first or highest priority is assigned to output port 14(5) because the register 32 contains a binary value of (100). The fifth priority is assigned to output port 14(1) because the register 32 contains a binary value of (000). The registers 32 are software loadable and can be programmed to specify any priority order desired.

Because the first priority of the register 32(1) contains a binary value of (100), output port 14(5) (if selected by the path selection command and identified as an option by the 5ENABLED output of AND gate 30(5) being active) is chosen to connect through the switch 10 to input port 12(1). If output port 14(5) is not an option because the 5ENABLED output is not active (logic low), then the register 32(1) specifies that output port 14(6) corresponding to the next stored binary value of (101) in the register is chosen for selection based on the 6ENABLED output of the AND gate 30(6). Next considered for connection to input port 12(1) is output port 14(7) in connection with the 7ENABLED output and binary value (110), then 14(8) in connection with the 8ENABLED output and binary value (111), then 14(1) in connection with the 1ENABLED output and binary value (000), then 14(2) in connection with the 2ENABLED output and binary value (001), then 14(3) in connection with the 3ENABLED output and binary value (010), and finally 14(4) in connection with the 4ENABLED output and binary value (011).

The priority selection of the register 32(1) is implemented by 8:1 MUXs 34(1)–34(8). The first MUX 34(1) determines if there is a first priority option available, the second MUX 34(2) determines availability of a second priority option, and so on. The priority bits stored in the first priority location of the register 32(1) feed MUX 34(1) as select signals for selecting the XENABLED signals output from the AND gates 30 as the output signal IN1-PRI1. The priority bits of the second through eighth priority locations of the register 32(1) feed MUX 34(2)–34(8) as select signals for selecting the xENABLED signals output from the AND gates 30 as the output signals PRE-PRI2 through PRE-PRI8.

Thus, assuming that the first priority of the register 32 has a binary value as shown of (100), the first MUX 34(1) selects and passes the fifth input signal (5ENABLED) received from AND gates 30 as its output signal IN1-PRI1. If 5ENABLED is high, the IN1-PRI1 signal output from MUX 34(1) also goes high to indicate that input port 12(1) has the option of connecting to its highest priority choice of output port 14(5). By this it is meant that output port 14(5) was commanded as an option in the path selection command by the controlling adapter 24, and also that output port 14(5) is not busy supporting a previous connection (i.e., it is available).

The selection circuit 26 further includes a priority tree 36 constructed by a plurality of AND gates for selecting the highest priority available for connection from up to eight possible options. The tree 36 prioritizes options two through eight represented by signals IN1-PRI1 and PRE-PRI2 through PRE-PRI8 to output signals IN1-PRI2 through IN1-PRI8. The highest priority option represented by signal IN1-PRI1 is output from MUX 34(1), and is not determined by the tree 36. The AND gates of the tree receive increasing numbers of PRE-PRI2 through PRE-PRI8 signals from MUX 34(2)–34(8). The first AND gate in the tree 36 receives only an input from MUX 34(1) and 34(2), while the last AND gate receives inputs from all of the MUX 34(1) –34(8).

Considering now the operation of the selection tree 36 with a specific example, if priority eight defined by MUX 34(8) is an option and all the other higher priorities are not options or busy, the last AND gate in the tree 36 will go active in its output IN1-PRI8 to select input port 12(1) to be connected to the eighth and last priority choice. It will, of course, be understood that all the other AND gates in the tree 36 and MUX 34(1) must be logic low for this to happen.

The algorithm for making a connection in the first embodiment is to try one connection at a time starting with the highest priority available and progressing to the lowest. If all priorities are exhausted and no connection can be found, the connection cannot be made at this time and is rejected using the REJECT interface line as in known in the art. The preferred method is not to handshake the path selection operation at the switch 10 for non-camp-on operations, but rather to have the adapter 24 issue the command to switch 10 and then wait the maximum amount time for the switch combinational logic to settle out before issuing the selection command to the following switch stage in an interconnected network. In this case the adapter 24 would separate the selection commands by enough dead fields (no-opposing counsel commands) to allow switch 10 to settle out in the worst case (this saves using a handshaking protocol).

However, trying all options can be time consuming, other algorithms are possible. First, for a non-camp-on operation try only a portion of the initially available options, rather than trying all of the options. If none of the portion of options are available, reject the operation and break all previously established connections in the network. This is a good compromise because it will shorten the time of set-up and the number of dead fields that have to be issued, while at the same time yielding a very high probability that a connection will be found among the portion of options. Second, in the camp-on mode switch 10 responds with a positive accept signal back to adapter 24 when it has found an available output and made the commanded connection. Thus, camp-on is relieved of any set-up timing requirements. This same approach could also be used for non-camp-on operations to free it from any timing restrictions as well, so that all options can be tried. This is also an excellent compromise if the switch 10 is connected directly to adapter 24, and handshaking would not add much overhead since they are direct connected.

The IN1-PRIx signals output from MUX 34(1) and the AND gates of the tree 36 each feed an individual decoder 38(1) to 38(8) for the purpose of defining which output port is associated with the given priority level. In this case, "x" again comprises 1–8 corresponding to the output ports 14(1)–14(8). The 3:8 decoders 38(1)–38(8) also receive the three priority bits from the corresponding priority location one through eight of the register 32 (1). The received priority bits are then decoded to identify one of the output lines nCONNECT1x as being selected by the priority bits, and the signal IN1-PRIX is output on that selected line. The designation "n" comprises the letters A–H corresponding to the decoders 38(1)–38(8).

For example, suppose that output port 14(5) which has the highest priority in the example given above was commanded in the path selection command and also was not busy. In such a case, the IN1-PRI1 signal output from MUX 34(1) corresponding to this highest priority selection would be high and the outputs of the AND gates of the tree 36 would be low. Decoder 38(1) is then activated by the IN1-PRI1 signal output from MUX 34(1) and becomes active (logic high), while all the other decoders 38(2)–38(8) remain inactive (logic low). Decoder 38(1) then decodes the three priority bits for the highest priority position output from register 32(1) relating to output port 14(5) and causes the decoder output line labeled ACONNECT15 to go high. The ACONNECT15 line output from decoder 38(1) goes active because the binary value of (100) output from the register 32 activates the fifth output line of the decoder. All the other decoder outputs from blocks 38(1) to 38(8) remain low.

A corresponding plurality of NOR gates 40(1)–40(8) receive the nCONNECT1x outputs from the decoders 38(1) –38(8). The nCONNECT11 outputs of the decoders 38(1) –38(8) are connected to the first NOR gate 40(1). Similar connections are made with respect to connecting the nCONNECT12–nCONNECT18 outputs from the decoders 38(1)–38(8) to the NOR gates 40(2) through 40(8). The NOR gates 40(1)–40(8) logically combine the nCONNECT1x signals to output Pre-Connect 1 to x signals, wherein "x" again refers to 1–8 corresponding to the output ports 14(1)–14(8).

Continuing with the foregoing example, the ACONNECT15 output line from decoder 38(1) is connected to the fifth NOR gate 40(5) along with the other nCONNECT15 outputs. The activation of this output line from decoder 38(1) causes the Pre-Connect 1 to 5 output line from the NOR gate 40(5) to go high indicating that input port 12(1) should try first to connect to output port 14(5). All the other Pre-Connect 1 to x outputs from the remaining NOR gates 40 remain inactive at this time.

Figure 2D:
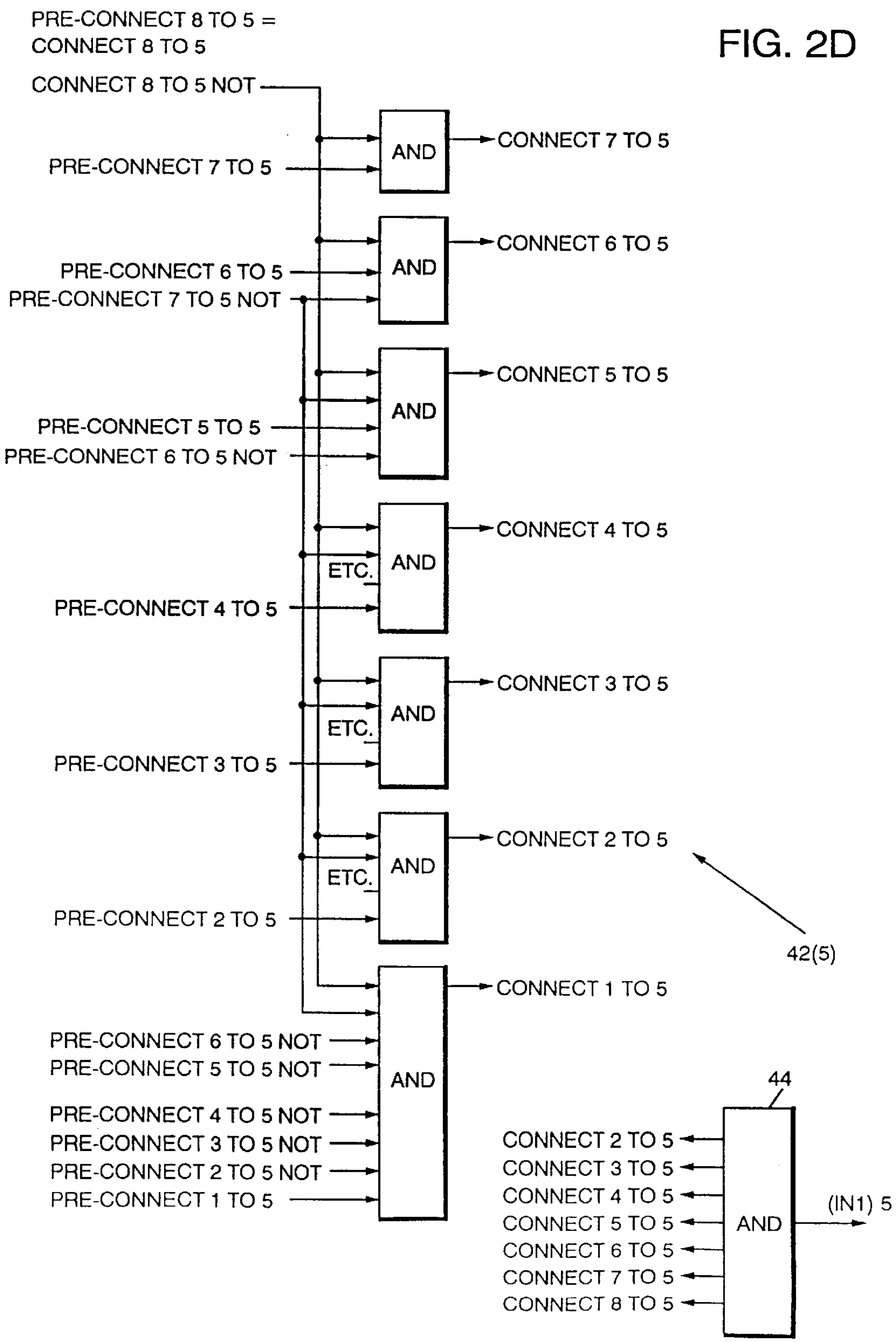
Figures 3, 3A, 3B, 3C:
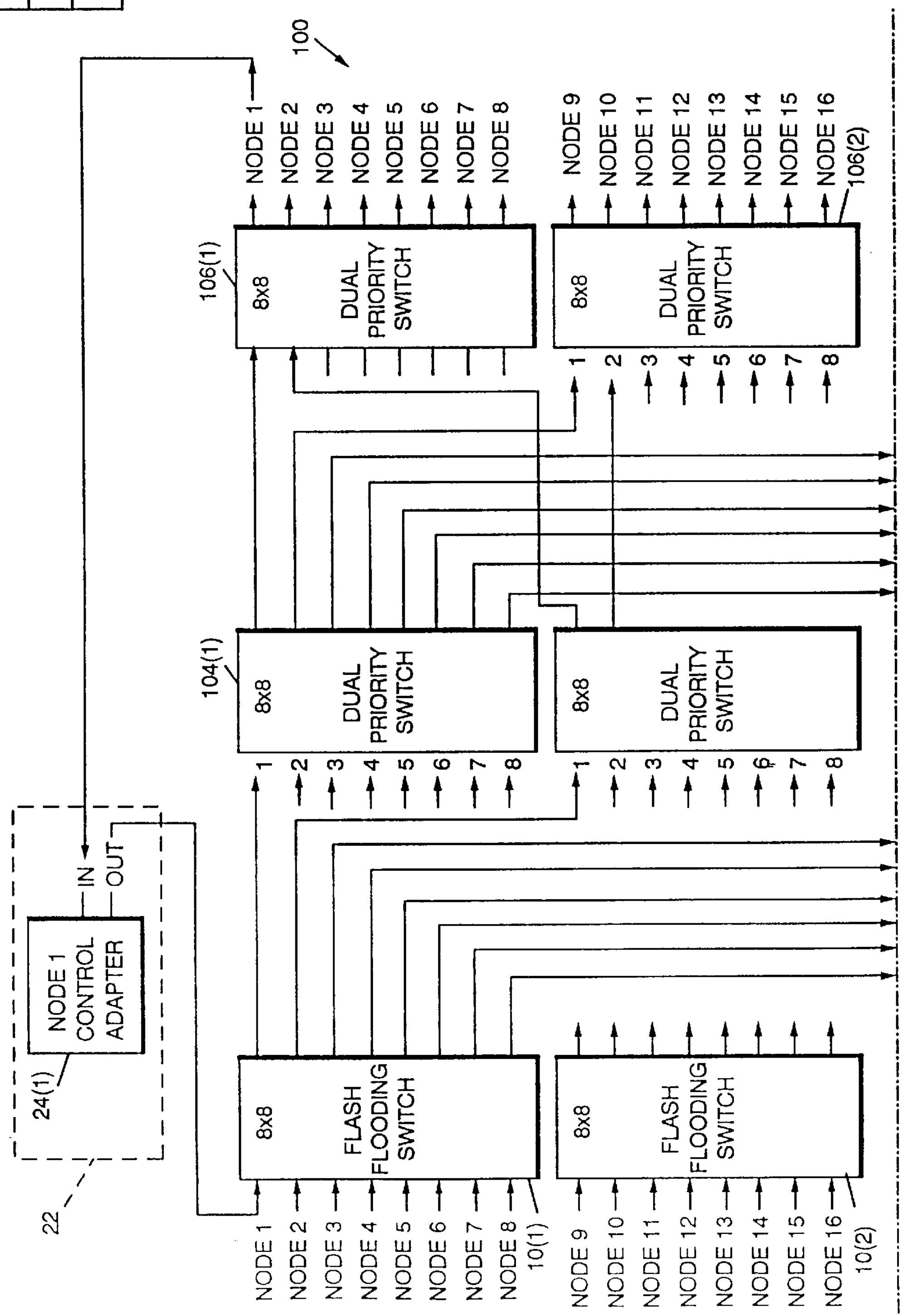
Figure 3B:
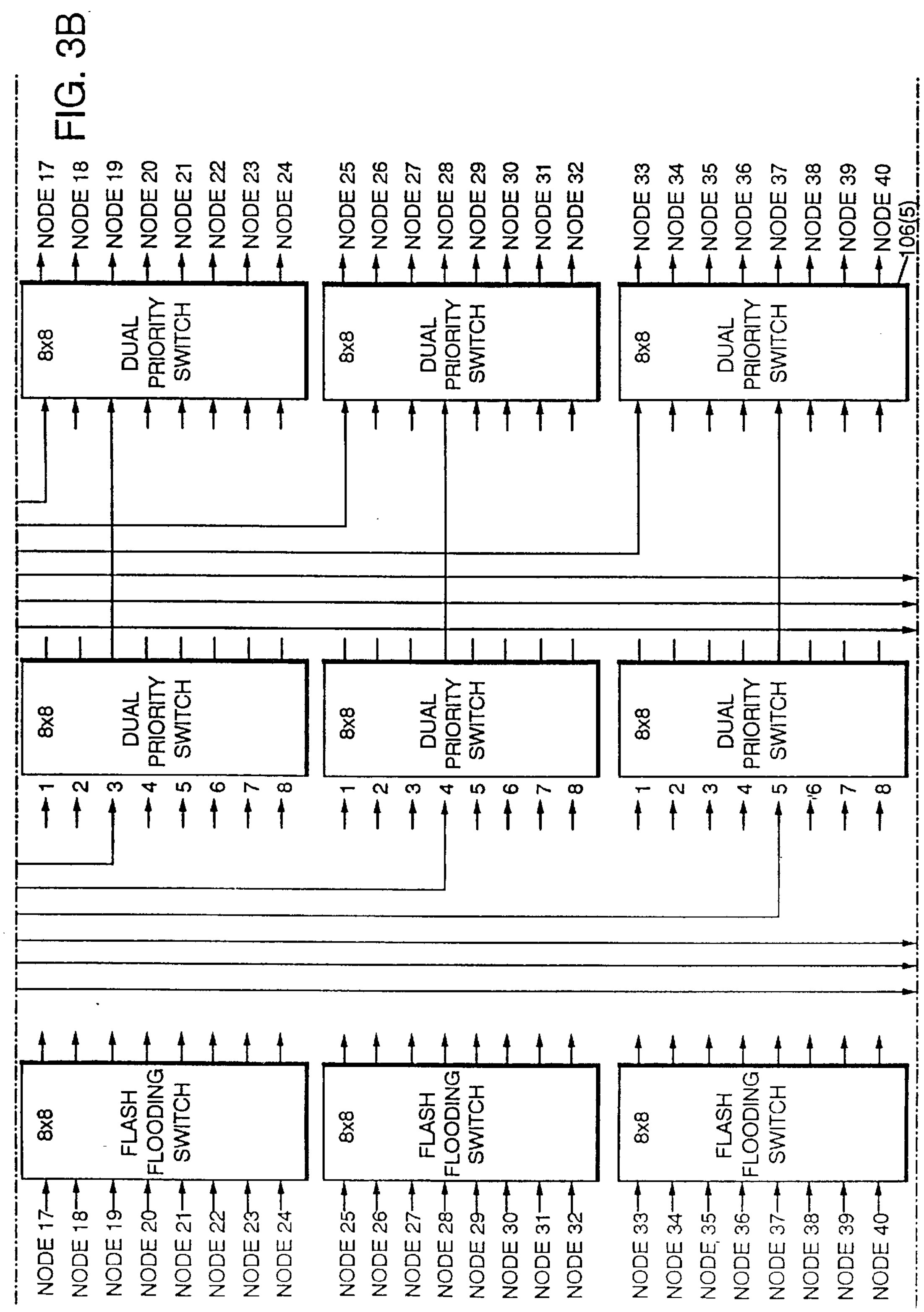
Figure 3C:
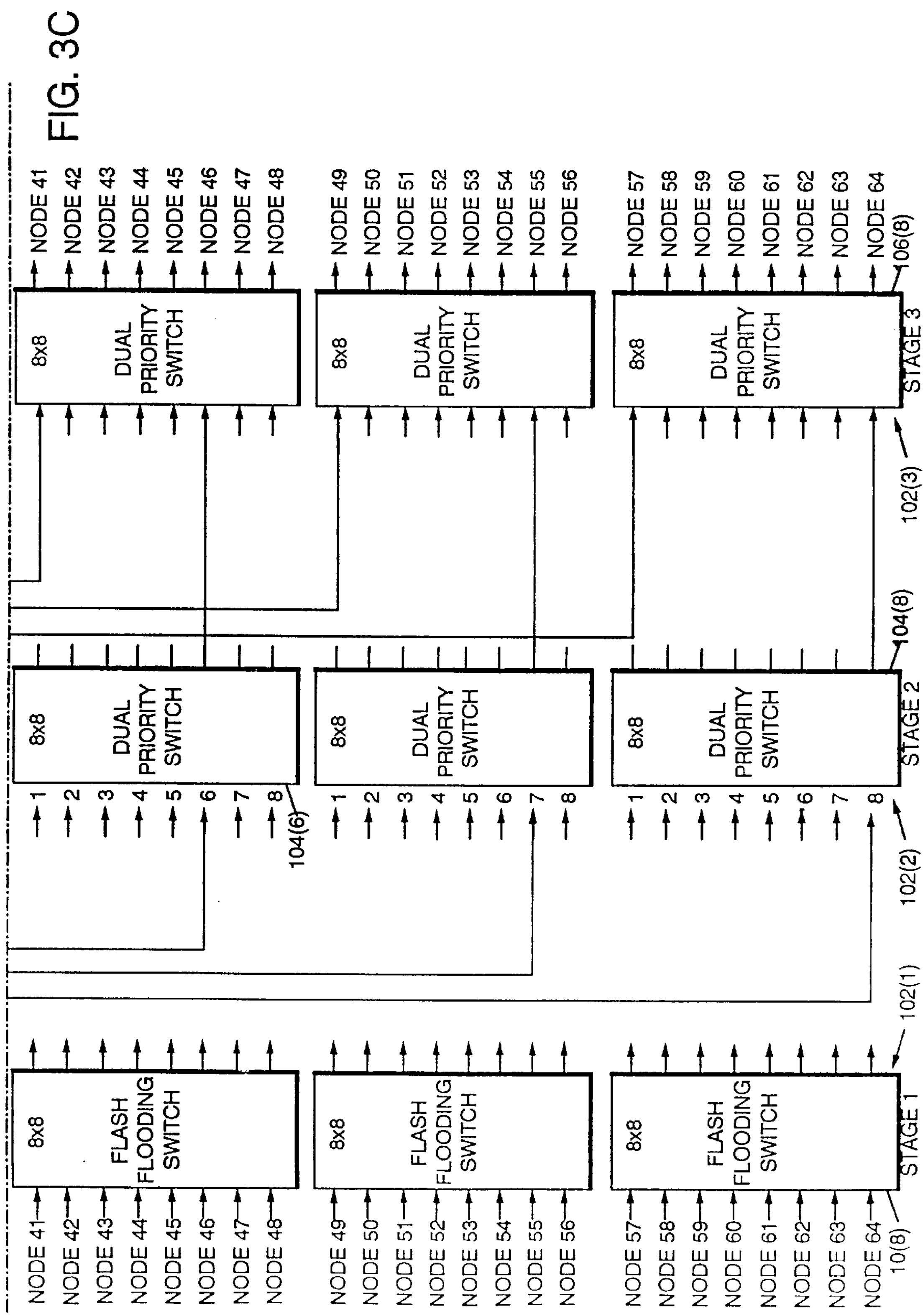

The final connection of input port 12(1) to output port 14(5) is not yet established, however, because other input ports 12 to the switch 10 might be contending for same output port 14(5) at the exact same time. This contention must be resolved before a winner can be declared. As shown in FIG. 2A, the path seeking functionality 20 accordingly further includes eight contention circuits 42(1)–42(8), each comprising a plurality of AND gates (FIG. 2D) which function to resolve this contention amongst the eight input ports 12(1)–12(8) to switch 10 by implementing a second priority function. The AND gates for contention circuit 42(5) for output port 14(5) are shown in FIG. 2D. It will, of course, be understood that any priority function can be chosen for the second priority implementation, even a round robin priority similar to the first priority could be used.

In accordance with this second priority function, input port 12(8) is assumed to be hardwired to have highest priority for connecting to a particular one of the output ports. As shown in FIG. 2D, Pre-Connect 8 to 5 (output from selection circuit 26(8) and referring to input port 12(8)) is set equal to Connect 8 to 5. Similar Pre-Connect y to 5 outputs are received by the contention circuit 42 and its AND gates from the other selection circuits 26, including selection circuit 26(1) which supplies the Pre-Connect 1 to 5 signal output from NOR gate 40(5). The designation "y" comprises 1–8 corresponding to the input ports 12(1)–12(8).

Input port 12(1) in FIG. 2D has the lowest priority. Because it has the lowest priority, input port 12(1) is connected to output port 14(5) only if no other input port 12 contends for output port 14(5) at the same time. In the event there are no other contenders, the last AND gate in the contention circuit 42 goes high indicating with signal Connect 1 to 5 that input port 12(1) has won the connection to output port 14(5).

If any other input port 12 having a higher priority is simultaneously contending for output port 14(5), one of the other AND gates of the selection circuit 42 also goes high indicating with signal Connect y to 5 that the higher priority input port 12 wins the connection to output port 14(5). This causes any of the AND gates in the selection circuit 42 having a lower priority to go low.

Returning again to the prior example, assume that input port 12(3) is also contending with input port 12(1) for connection to output port 14 (5). The appropriate AND gate of the selection circuit 42 goes high with signal Connect 3 to 5. The AND gates in the selection circuit 42 having a lower priority, including the last AND gate outputting signal Connect 1 to 5, go low. This indicates that input port 12(1) has lost the contention for output port 14(5). Following a loss of contention for an output port 14, the switch 10 then moves on and tries the next highest priority path specified in the register 32 for input port 12(1). Such retries continue until the switch 10 is either successful in making a connection or has exhausted all possibilities for connection to the output ports 14(1)–14(8).

The circuits 42(1)–42(8) further each include a NAND gate 44 in the circuit 20 for the purpose of determining when a selected output port 14 should be de-selected. For example, the Connect y to x signals (for y=2 to 8; and x=5) are input to the NAND gate 44 of contention circuit 42(5) to output the 5BUSYNOT signal. Similar connections are made (but not shown) for the other NAND gates 44 in the other contention circuits 42.

The outputs from the NAND gates accordingly comprise the xBUSYNOT signals which are fed to the corresponding DFF latches 28(1)–28(8) (D input) and AND gates 30(1)–30(8) in the selection circuits 26. These connections affect operation of the circuit 26 in that the AND gates 30(1)–38(8) go low in response to the xBUSYNOT signal being low, thus causing the XENABLED signal to also go low de-selecting the corresponding output port 14 as busy (i.e., the port is removed from consideration). In response to such a de-selection, the MUXs 34(1)–34(8) recalculate the newest high priority connection and proceed to try again in the first embodiment, and corresponding connection is deleted from parallel consideration in the second embodiment. Thus, in the foregoing example, when the input port 12(3) connects to output port 14(5), signal Connect 3 to 5 goes active, and NAND gate 44(5) outputs a low 5BUSYNOT signal that is fed to AND gate 30(5) to send the 5ENABLED signal low effectuating a de-selection of output port 14(5) from consideration for connection to input port 12(1) in either the first or second embodiments.

The registers 32 used in the circuits 26 for the first embodiment change dynamically after each connection is made. Thus, following establishment of a valid connection, the shift register 32 updates itself by shifting left until the binary value for the output port 14 selected for the connection is moved to the eighth and lowest priority level. For example, if first priority output port 14(5) was selected for connection to input port 12(1), register 32(1) would shift left three places (three bits x one priority position). The first priority in register 32(1) would then be loaded with a binary value of (101) and the last priority would be loaded with a binary value of (100). This makes output port 14(6) the highest priority port and output port 14(5) the lowest priority port. Conversely, if third priority output port 14(7) were selected for connection to input port 12(1), register 32(1) would shift left nine places (three bits x three priority positions).

An alternative to the first embodiment of the path seeking functionality 20 of the switch 10 of FIG. 1 comprises non-blocking, prioritized path seeking functionality 20'. In this mode, the same parallel path seeking capability as described above with respect to FIGS. 2A–2D is used, and again involves the ability of each switch 10 to determine for itself which of several optional alternate paths to select at each stage of the network based on availability. However, this mode differs in that the single round robin priority scheme (using the registers 32) described above is split into two subsets of round robin priorities—a first subset and a second subset. A portion of the output ports 14 are uniquely assigned to each subset over the control interface (using any of the three options described above), and the two subsets comprise the entire eight output ports 14 per switch 10. The first subset is assigned higher priority than the second subset, such that a connection commanded to any of the eight output ports 14 will try to establish a connection first to any of the output ports assigned to the higher priority first subset. Only if all the first subset output ports 14 are unavailable will a connection be made to an output port in the lower priority second subset. Conversely, a connection directed to the second and lower priority subset will only try to make a connection within its own subset, and will never try to connect to an output port 14 in the first and higher priority subset. An alternative to this embodiment comprises the connection to an output port in the first subset if all the second subset output ports are unavailable.

The advantage of dual priorities as described above for the functionality 20' is that it makes the switch 10 non-blocking. This is because a crossbar switch like the switch 10 commanded to make a connection to any of its available outputs must always find at least one available output port and make a valid connection. However, in this case the non-blocked connection will be made on a priority basis and will try to establish a connection first to any of the output ports assigned to the first subset. For example, the output ports restricted to "cold" traffic could be assigned to the first subset, and the output ports restricted to "hot" traffic could be assigned to the second subset. This way a try over the "cold" paths is always non-blocking. It will always try the "cold" paths first (from the first subset) and usually find a "cold" output port for connection. However, if all the "cold" paths are unavailable, it will try the "hot" paths next (from the second subset) and always find a "hot" path available. At the very next switch stage the "cold" traffic can be routed back onto the "cold" paths, because it will try those paths first at the next switch stage. Thus, rather than rejecting "cold" traffic at the switch if all the "cold" paths are unavailable, it will try a "hot" path in hopes that they are experiencing a low traffic level at this time and can be used to support a connection to the destination required. Conversely, a connection directed to the second subset of output ports as a "hot" connection will only try the "hot" paths. If all the "hot" paths are unavailable, it will camp-on the "hot" paths and wait for one of them to become available. This is preferential to trying the first subset of paths which would place "hot" traffic onto "cold" paths and could adversely affect the performance of the switch and any network in which it is connected.

Referring to FIG. 3, there is shown a block diagram of a sixty-four by sixty-four Flash-Flood Network 100 in accordance with the present invention. The network 100 includes three stages 102. The first stage 102(1) utilizes the switch 10 of FIG. 1 providing the second embodiment of the path seeking functionality 20 in addition to the well known camp-on functionality 16 and break functionality 18. Stage one 102(1) of the network 100 includes eight such switches 10(1)–10(8). The second and third stages 102(2) and 102(3) of the network 100 utilize the well known ALLNODE Switch 104 and 106 as described in U.S. Pat. No. 5,444,705 to Olnowich et al. entitled "Dual Priority Apparatus for Switching Networks" having camp-on functionality 16 and break functionality 18. Stage two 102(2) of the network 100 includes eight such switches 104(1)–104(8), and stage three 102(3) of the network also includes eight such switches 106(1)–106(8). The switches 10, 104 and 106 work jointly in and across three stages 102 of the network 100 to provide a high performance connection among and between sixty-four nodes.

The network 100 includes an adapter function 22 comprising a controlling adapter 24 connected to every input port 12 (only one 24(1) shown for input port 12(1) for simplicity reasons). In the network 100, the controlling adapters 24 command the operation of the switches 10 through the transmission of path selection commands. In accordance with the second embodiment of the path selection functionality 20 of the switch 10, an initial determination is made concerning which of the selected paths are available, and then the switch immediately establishes a parallel connection over all of the available paths. This operation to establish multiple path connections over designated paths in a parallel operation is referred to in the art as a directed flash-flood.

Figures 4, 4A, 4B, 4C:
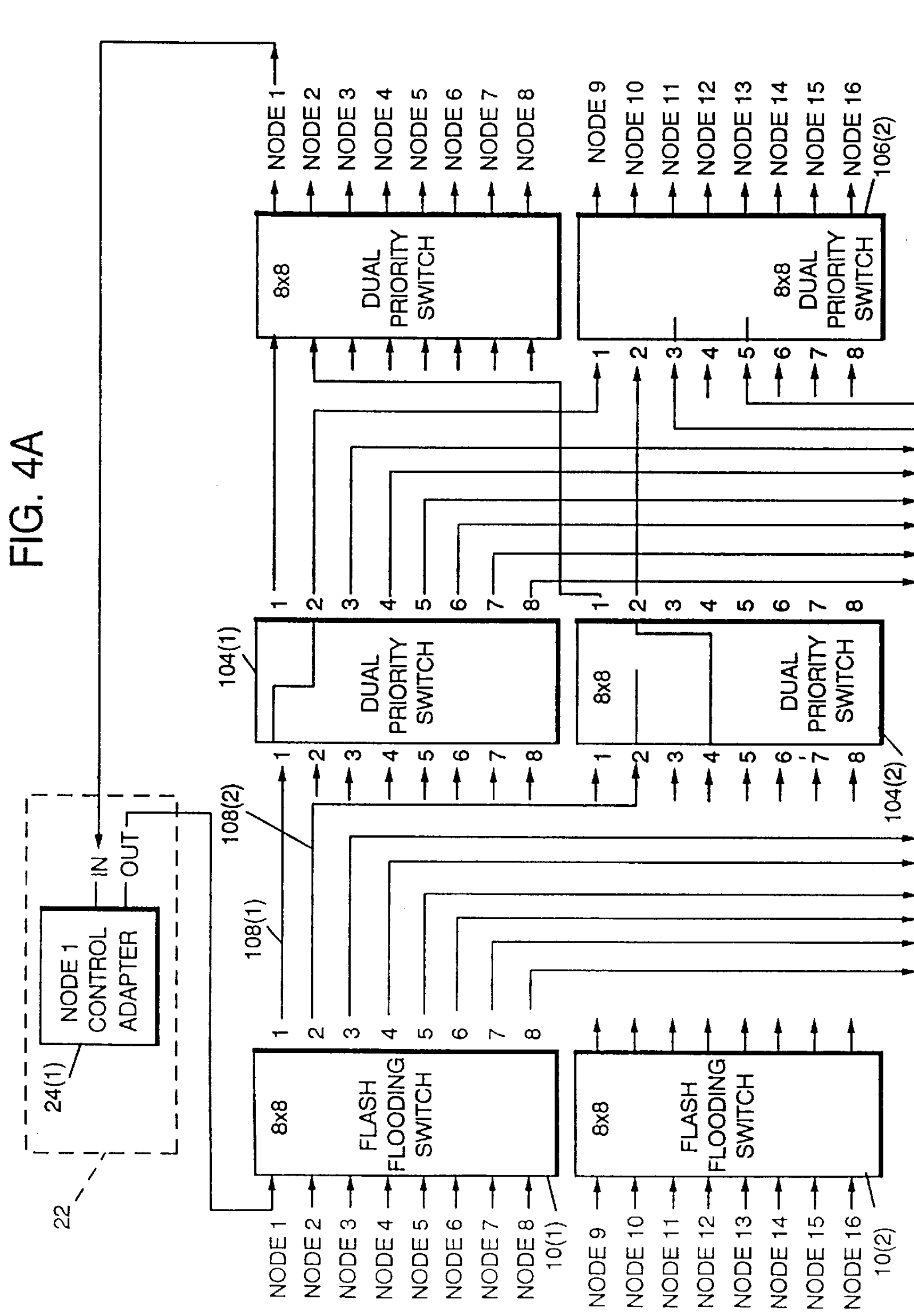
FIG. 4 illustrates an example of a flash flooding operation performed on the network shown in FIG. 3.
Figure 4B:
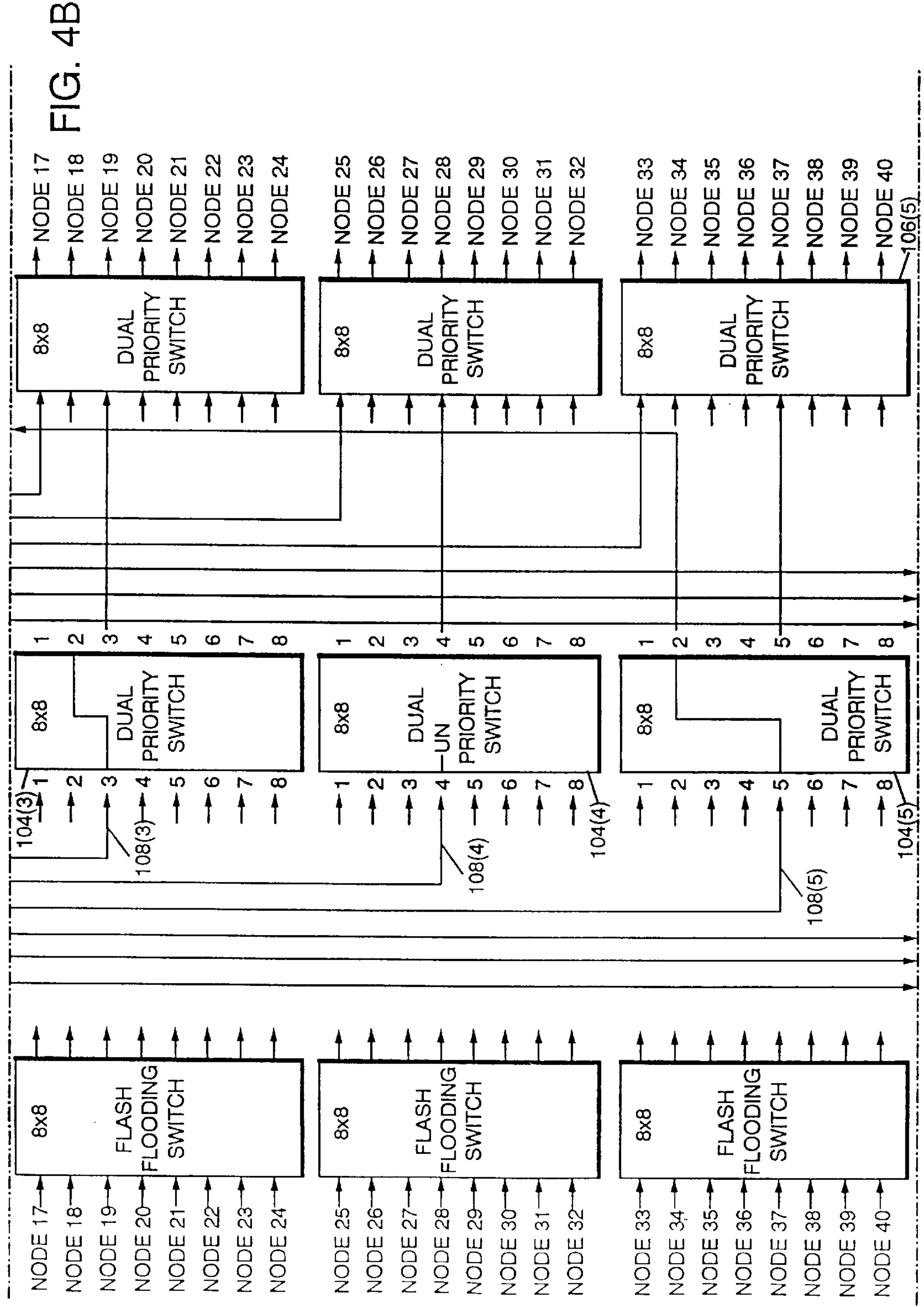

To illustrate the foregoing in the network 100, reference is now made to FIG. 4. Assume that NODE 1 wants to send a message to NODE 12. This message is sent by NODE 1 to input port 12 (1) of switch 10 (1). There are eight distinct paths 108 from switch 10(1) through the network to NODE 12: the first path 108(1) extends from the first output port of switch 10(1) through switch 104(1) and switch 106(2) to NODE 12; the second path 108(2) extends from the second output port of switch 10(1) through switch 104(2) and switch 106(2) to NODE 12; the third path 108(3) extends from the third output port of switch 10(1) through switch 104(3) and switch 106(2) to NODE 12; and so on. Any of identified eight paths 108 is available from switch 10(1) to reach NODE 12. Furthermore, the eight paths 108 may be split into different functional groups ("cold" and "hot", for instance) in accordance with the commands of the control adapter 24.

It is up to switch 10(1) to decide which of the commanded paths to flash-flood based on path availability. Switch 10(1) must flash-flood all of the paths from the choices given to it by its controlling adapter 24(1) in the path selection command, and which are also determined to be available. It is assumed for this example that the controlling adapter 24(1) has commanded the flash-flooding of paths 108(1)–108(6) comprising the "cold" set of alternate paths to NODE 12 (i.e., path selection command with a binary value of (11111100)). In this case however, two of these six commanded paths (paths 108(4) and 108(6)) are unavailable due to either supporting a previous connection or being failed as indicated by the designation "UN". Thus, switch 10(1) simultaneously connects in a parallel operation from input port 12(1) only to the four output ports 14 for paths 108(1)–108(3) and 108(5) which are available. This connection is then propagated forward through the entire network 100 beyond the confines of the switch 10(1), with the same information being transmitted over each of the four paths in a simultaneous manner toward NODE 12.

At the second stage 102(2) of the network 100, each of the switches 104(1)–104(3) and 104(5) connected to switch 10(1) along paths 108(1)–108(3) and 108(5) attempts to form a connection to its second output port to switch 106(2) of the third stage 102(3). This connection is the only connection attempted because that particular output port for the switches 104 is the only stage two 102(2) output port that could reach the switch 106(2) connected to destination NODE 12. If the second output port of any of the switches 104 at issue is previously busy, the attempted connection is rejected at that busy switch only. For example, switch 104(2) is assumed to have a previous connection 110 from its fourth input port to its second output port. Accordingly, the attempted connection through switch 104(2) along path 108(2) to the second output port is rejected as indicated by the designation "RJ".

The connections through the switches 104(1)-104(3) and 104(5) along the remaining three paths 108(1), 108(3) and 108(5) to the third stage 102(3) are, however, made successfully as shown. At the third stage 102(3), the remaining three paths 108(1), 108 (3) and 108(5) converge on switch 106(2) for potential connection through to its fourth output port and the desired destination of NODE 12. At switch 106(2), only one of the three flash-flooded paths is successfully connected through to NODE 12. The one path that is connected through switch 106(2) comprises either the connection which arrives first or the one of multiple simultaneous connections which arrives on the highest priority input port. The remaining other paths are rejected. In the illustrated example, path 108(1) is the winner and is connected through to NODE 12 because it has the highest priority input port. The rejected path connections at switch 106(2) are indicated by the designation "RJ". The partially connected portions of the rejected paths 108(2), 108(3) and 108(5) are immediately broken, freeing these paths to be used in subsequent flash-flood attempts.

Conventional switch interconnection is made between stage two 102(2) and stage three 102(3) of the network. In conventional interconnection, the output ports of a first switch (such as the switch 104(1)) are connected to the first input ports of the switches 106(1)–106(8), the output ports of a second switch (such as the switch 104(2)) are connected to the second input ports of the switches 106(1)–106(8), the output ports of a third switch (such as the switch 104(3)) are connected to the third input ports of the switches 106(1)–106(8), and so on.

The switches 10 and 104 of the network 100 of FIG. 3, however, are interconnected in a unique manner that enables the directed flash-flood to be performed efficiently even under high loading conditions (for example, when many nodes simultaneously attempt a flash-flood operation). In accordance with this unique interconnection, the first output port of switch 10(1) is connected to the first input port of switch 104(1), the second output port of switch 10(1) is connected to the second input port of switch 104(2), and so on. Similar connections are made between the remaining switches 10(2)–10(8) and the switches 104(1)–104(8) such that each switch 10 in the first stage 102(1) is connected to: a first input port of one switch 104; a second input port of another switch 104; a third input port of yet another switch 104; and so on, in the second stage 102(2). This manner of interconnection is important because the priority among and between input ports in the switches 14 and 106 is assigned in descending order starting with the first input port being of the highest priority. Accordingly, by interconnecting the switches 10 and 104 in this manner, each switch 10 in the first stage 102(1) connects with every possible priority level to a switch 104 in the second stage 102(2). The practical effect of this interconnection is that if all of the switches 10(1)–10(8) flash-flood simultaneously, each switch would, due to the priorities and interconnect, win a different switch 104 in the second stage 102(2), and all eight simultaneous flash-flood operations would establish a successful connection to the second stage. Other connection methods, such as the conventional method described above and used between the second stage 102(2) and third stage 102(3), would in a similar situation result in as few as one successful connection.

In a conventional All Node Switch, such as that known in the art and used for switches 104 and 106, the logic associated with the REJECT line concerns only the attempting of a single connection at a time. When that connection is not successful, the REJECT line is activated, and this signal is propagated back through the network to the controlling adapter 24 connected to the input port from with the connection request originated. In response to receipt of the REJECT signal, the controlling adapter 24 cancels the connection attempt by dropping the VALID signal.

In the network 100 of FIG. 3 using the path seeking switch 10 of FIG. 1, flash-flooding operations occur where more than one connection is being simultaneously requested and perhaps partially completed. If conventional processing of the REJECT signal occurred in the network 100, the first failed connection and signal on the REJECT line would cause a termination of all requested connections. Accordingly, the network 100 includes a REJECT combination function 120 which logically ANDs the REJECT signals from all of the alternate paths being attempted during each flash-flood. If any one or several of the REJECT lines associated with the paths being attempted is activated (indicating a failure of the connection for those paths), the remaining paths continue to be tried. The attempt to establish a flash-flood connection is unsuccessful only when all of the commanded paths return a REJECT indication. Only in that case is the AND operation satisfied and a REJECT indication propagated backwards through the network 100 to the controlling adapter 24 informing of connection failure. The flash-flood operation is then canceled by the controlling adapter 24 by dropping the VALID signal.

Although preferred embodiments of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A multi-stage interconnection network, comprising:

a first stage including a plurality of first self-routing switches, each first switch including a plurality of input ports and a plurality of output ports;

a second stage including a plurality of second self-routing switches, each second switch including a plurality of input ports and a plurality of output ports;

means for connecting the output ports of each first switch in the first stage to second switches of the second stage forming a plurality of paths therebetween;

inputs to said first switches comprising network input ports and outputs from said second switches comprising network output ports;

a node connected between each of the network output ports and each of the network input ports, whereby the switching network establishes direct connections between any of the network input ports and network output ports, whereby each direct connection from one of the network input ports to one of the network output ports is comprised of an equal number of switch stages;

said first switches and second switches further comprised of a plurality of self-routing means for making and breaking connections between the plurality of input ports and the plurality of output ports;

said first switches and second switches further comprised of a plurality of self-routing camp-on functionalities for holding attempted connections between switches awaiting availability; and means for simultaneously attempting parallel path connections over certain ones of the plurality of first paths between certain output ports of one of the first switches of the first stage and certain input ports of the second switches of the second stage in a flash-flood operation.

2. The network of claim 1 further comprising:

a third stage including at least one third switch, each third switch including a plurality of input ports and a plurality of output ports; and means for connecting the output ports of second switches in the second stage to the input ports of third switches in the third stage forming a plurality of second paths therebetween.

3. The network as in claim 2 wherein the first, second and third switches each include:

a camp-on functionality for holding attempted path connections between switches awaiting availability; and a break functionality for terminating attempted path connections between switches when blocked.

4. The network as in claim 2 wherein the second switches implement a plurality of priority levels in the second stage, and wherein the means for connecting each first switch in the first stage to each second switch in the second stage connects each first switch to second switched at every possible priority level in the second stage.

5. The network as in claim 1 further including means for generating a REJECT signal for failed attempted path connection.

6. The network as in claim 5 further including means for logically combining the REJECT signals for all parallel attempted path connections to generate a combination REJECT signal indicative of the failure of each of the parallel attempted path connections.

7. The network as in claim 6 further including means responsive to combination REJECT signal for terminating the path seeking functionality of the first switch that attempted the failed parallel path connections.

8. The network as in claim 1 wherein the means for simultaneously attempting comprises a path seeking functionality in each first switch, the path seeking functionality assessing in parallel multiple output ports for connection to a certain input port of that first switch to establish parallel connections with the second stage over the certain ones of the plurality of first paths.

9. The network as in claim 8 wherein the path seeking functionality comprises:

means responsive to a path selection command for attempting to access in parallel each connection identified in the command extending between the certain input port and the multiple output ports of the first switch; and means for eliminating from consideration each connection identified in the command that is unavailable.

10. The network as in claim 9 wherein the path seeking functionality further includes means for prioritizing the connections identified in the command.

11. The network as in claim 10 wherein the means for prioritizing comprises a round robin prioritization among the connections extending between the certain input port and the multiple output ports.

12. The network as in claim 11 wherein the means for prioritizing further comprises means for determining whether any other input port is requesting connection to any of the same multiple output ports.

13. The network as in claim 12 further including means for prioritizing contention among input ports for connection to the multiple output ports.

14. The network as in claim 12 further including means for resolving contention among input ports for connection to the multiple output ports.

15. A self-routing switch, comprising:

a plurality of input ports;

a plurality of output ports;

means for selectively coupling the input ports to the output ports by way of connections;

a path seeking functionality for controlling the operation of the means for selectively coupling, the path seeking functionality including means for simultaneously processing a plurality of commands received at certain ones of the input ports, each command identifying multiple connections from each certain input port to certain ones of the output ports, the means for processing evaluating availability of the multiple connections identified in each command; and a connection means for establishing one and only one connection from each certain input port to one of the certain ones of the output ports.

16. The switch as in claim 15 wherein the path seeking functionality further comprises as to each command means for simultaneously attempting establishment of communication over each of the command identified multiple connections found to be available by the means for processing.

17. The switch as in claim 16, further comprising:

means for determining as to each command if a connection is established by one of said connection attempts for simultaneously attempting establishment of communications over the command identified multiple connections found to be available by the means for processing; and means for rejecting as to each command the communication if a connection cannot be established by any of said connection attempts for simultaneously attempting establishment of communication.

18. The switch as in claim 15 wherein the patch seeking functionality further comprises as to each command:

means for prioritizing command identified multiple connections found to be available by the means for processing; and means for establishing communication over the command identified connection having the highest priority.

19. The switch as in claim 18, further comprising as to each command:

means for testing for the completion of the connection with the highest priority; and means for rejecting the communication if highest priority connection is not completed.

* * * * *